(12) United States Patent
Kitai et al.

(10) Patent No.: US 7,238,913 B2
(45) Date of Patent: Jul. 3, 2007

(54) FLEXIBLE SCAN FIELD

(75) Inventors: Anton T. Kitai, Ottawa (CA); Jonathan S. Ehrmann, Sudbury, MA (US)

(73) Assignee: GSI Group Corporation, Billerica, MA (US)

( * ) Notice: Subject to any disclaimer, the term of this patent is extended or adjusted under 35 U.S.C. 154(b) by 0 days.

(21) Appl. No.: 10/967,895

(22) Filed: Oct. 18, 2004

(65) Prior Publication Data

US 2005/0161444 A1    Jul. 28, 2005

Related U.S. Application Data

(60) Provisional application No. 60/512,043, filed on Oct. 17, 2003.

(51) Int. Cl.
B23K 26/06 (2006.01)
(52) U.S. Cl. ............ 219/121.73; 219/121.75; 219/121.8
(58) Field of Classification Search ........... 219/121.67, 219/121.68, 121.6, 121.61, 121.76, 121.62, 219/121.78, 121.7, 121.79, 121.71, 121.8, 219/121.74, 121.81, 121.75, 121.73
See application file for complete search history.

(56) References Cited

U.S. PATENT DOCUMENTS

| | | | | |
|---|---|---|---|---|
| 4,289,378 | A | * | 9/1981 | Remy et al. ............ 359/368 |
| 4,532,402 | A |   | 7/1985 | Overbeck |
| 5,109,149 | A | * | 4/1992 | Leung ............... 219/121.69 |
| 5,168,454 | A | * | 12/1992 | LaPlante et al. ........... 700/166 |
| 5,171,964 | A | * | 12/1992 | Booke et al. .......... 219/121.19 |
| 5,293,025 | A | * | 3/1994 | Wang ................. 219/121.71 |
| 5,362,940 | A |   | 11/1994 | MacDonald et al. |
| 5,523,543 | A | * | 6/1996 | Hunter et al. .......... 219/121.62 |
| 5,998,759 | A |   | 12/1999 | Smart |
| 6,177,998 | B1 |   | 1/2001 | Svetkoff et al. |
| 6,181,425 | B1 |   | 1/2001 | Svetkoff et al. |
| 6,204,955 | B1 |   | 3/2001 | Chao et al. |
| 6,249,347 | B1 |   | 6/2001 | Svetkoff et al. |
| 6,307,799 | B1 | * | 10/2001 | Ngoi et al. ................ 365/215 |
| 6,341,029 | B1 |   | 1/2002 | Fillion et al. |
| 6,366,357 | B1 |   | 4/2002 | Svetkoff et al. |
| 6,430,465 | B2 |   | 8/2002 | Cutler |
| 6,437,283 | B1 | * | 8/2002 | Wiggermann et al. ... 219/121.7 |
| 6,452,686 | B1 |   | 9/2002 | Svetkoff et al. |
| 6,462,306 | B1 |   | 10/2002 | Kitai et al. |
| 6,476,351 | B1 | * | 11/2002 | Kaplan et al. ......... 219/121.69 |
| 6,483,071 | B1 |   | 11/2002 | Hunter et al. |
| 6,495,791 | B2 |   | 12/2002 | Hunter et al. |
| 6,496,292 | B2 |   | 12/2002 | Fillion et al. |
| 6,501,061 | B1 |   | 12/2002 | Kitai et al. |

(Continued)

Primary Examiner—Kevin Kerns
Assistant Examiner—Michael Aboagye
(74) Attorney, Agent, or Firm—Maine & Amus

(57) ABSTRACT

An energy beam machining system includes an emitter for emitting an energy beam and beam adjusting optics, such as a zoom telescope, for adjusting the pupil size of the system to multiple values. The adjusting of the pupil size can be carried out automatically, semi-automatically, or manually. In manual modes, instructions can be presented to the operator (e.g., via a monitor or pre-programmed audio instruction) indicating how to adjust pupil size. A focus lens focuses the adjusted beam directed along each path at a different focal point within a scan field encompassed in the field of view of the focus lens. Beam directing optics are configured to enable multiple scan fields within the field of view of the focus lens.

29 Claims, 5 Drawing Sheets

U.S. PATENT DOCUMENTS

| | | |
|---|---|---|
| 6,573,473 B2 | 6/2003 | Hunter et al. |
| 6,633,338 B1 | 10/2003 | Pelsue et al. |
| 6,639,177 B2 | 10/2003 | Ehrmann et al. |
| 6,674,045 B2 * | 1/2004 | Iwase et al. ............. 219/121.8 |
| 6,750,974 B2 | 6/2004 | Svetkoff et al. |
| 6,777,645 B2 | 8/2004 | Ehrmann et al. |
| 6,787,734 B2 * | 9/2004 | Liu ........................ 219/121.7 |
| 6,875,950 B2 | 4/2005 | Naumov et al. |
| 6,951,995 B2 | 10/2005 | Couch et al. |
| 2005/0279739 A1 | 12/2005 | Bruland et al. |

* cited by examiner

| SCAN FIELD SIZE AND SHAPE | GALVO-MIRROR ADJUSTMENT | X-Y STEP SIZE | ZOOM TELESCOPE ADJUSTMENT | CALIBRATION |
|---|---|---|---|---|
| 610 | 610' | b'' | b' | b''' |
| 620 | 620' | a'' | a' | a''' |
| 630 | 630' | a'' | a' | a''' |
| 640 | 640' | c'' | c' | c''' |
| ... | ... | ... | ... | ... |

FIG. 6

FLEXIBLE SCAN FIELD

RELATED APPLICATIONS

This application claims the benefit of U.S. Provisional Application No. 60/512,043, filed Oct. 17, 2003, which is herein incorporated in its entirety by reference.

FIELD OF THE INVENTION

The invention relates to energy beam scanning, and more particularly, to optimizing characteristics of a laser beam to the applicable machining operations.

BACKGROUND OF THE INVENTION

Energy beams, such as laser beams, are commonly used in numerous different types of machining operations, including what are often referred to as micro-machining operations. In conventional micro-machining operations, laser beams are used to machine features on substrates, such as printed circuit boards and panels. One typical micro-machining operation involves the laser trimming of resistors and capacitors printed on a substrate.

FIG. 1 depicts a conventional laser beam micro-machining system 10 of the type used for resistor trimming. The system 10 includes a laser beam emitter 15 operating under the control of the system controller 55. The emitted laser beam 20 passes through a fixed beam expander 25 to the scan subsystem 30.

As shown, the scan subsystem 30 includes beam directing optics 35 and a focus lens 40. The scan system 30 also operates under the control of the system controller 55. The beam 20 is directed by the beam directing optics 35 through the focus lens 40. The beam directing optics 35 includes a pair of galvo driven mirrors. The focus lens 40 has a field of view and focuses the beam 20 so that the beam 20 impinges point 22 on a resistor 45 on the substrate 50 to perform the trimming operation. An X-Y stage 52 is provided to move the substrate 50 in two axes to position the resistor under the field of view of the lens 40. The focal point 22 of the directed beam impinges on the substrate 50, so as to perform the trimming operation.

The fixed beam expander 25 establishes the size (effective entrance pupil) of the beam entering the scan system 30. As shown in FIG. 1, using the fixed beam expander 25 results in the collimated beam entering the scan subsystem having a pupil size B which corresponds to a spot size B' of the beam at the focal point 22 on the focal surface. Thus, should a larger or smaller spot size be desired, the fixed beam expander 25 must be replaced with another beam expander having the appropriate beam expansion ratio to achieve the desired spot size.

Generally, if a larger spot size is desired at focal point 22, a fixed beam expander that will cause the effective entrance pupil size of the beam entering the scan subsystem to be less than B must be substituted for the fixed beam expander 25. On the other hand, if a smaller spot size is desired at the focal point 22, a fixed beam expander that will cause the effective entrance pupil size of the beam entering the scan subsystem to be greater than B must be substituted for the fixed beam expander 25. In any such cases, the beam expander must be changed.

In addition, it has recently become necessary for such machines as shown in FIG. 1 to be used in machining features on substrates having various sizes and/or various shapes. Varying the size and/or shape of the substrate will result in a need to vary the size of the scan field that must be covered by a focused beam having the desired spot size. The step size of the X-Y stage movement may also have to correspondingly change. Accuracy of beam placement and the degree of telecentricity may also vary with the changes in the field size.

The achievable spot size within the scan field in a conventional laser machining system is governed by a number of factors, including the pupil size and the focus lens characteristics. Relevant focus lens characteristics include the lens focal length, the lens performance degradation at large angles, the telecentricity of the focus lens, and the complexity and cost of the focus lens.

With regard to degradation, it will be understood that focusing a beam through the outside area of the focus lens will often result in degraded performance when smaller spots are desired. In addition, beam positional accuracy may be degraded near the perimeter of the focal surface when the field size is increased. Moreover, in a non-telecentric system, telecentricity may also be degraded near the perimeter of the focal surface at increased field sizes.

To address a large scan field, a focus lens having a large field of view and a long focal length must be used. Without increasing the beam pupil size, this will result in the beam having a large spot size at the focal surface. However, if the pupil size is increased, the size of the mirrors or other beam directing components must also be increased, thereby degrading dynamic performance. To achieve a smaller beam spot size at the focal surface, without increasing the focal length, the beam pupil size at the beam directing optics must be increased.

For some scan field applications, a focus lens having a high degree of telecentricity may be required. However, if the packing density of the features to be machined is high, resulting in the need for a small beam spot size at the focal surface, then the complexity and cost of designing and manufacturing such a focus lens can be quite high.

Accordingly, conventional approaches to machining features at varying packing densities on substrates having different sizes and/or shapes is to utilize separate systems, with a fixed field size and X-Y stage step size, optimized for each particular machining application, as required. A separate focus lens for different fields is required. The different focus lenses are manually installed and de-installed in the scan subassembly prior to initiating of the machining of features for a particular job. This results in increased manufacturing costs.

Hence, the need exists for a machining system capable of machining features at various packing densities on substrates having different sizes and/or shapes without resorting to a different system or manually changing the focus lens in the scanning subassembly.

SUMMARY OF THE INVENTION

One embodiment of the present invention provides a flexibly optimized material processing system. The system includes a laser emitter configured to emit a laser beam. Beam adjusting optics having a beam expansion ratio are configured to adjust the emitted laser beam by adjusting the beam expansion ratio. Beam directing optics are configured to provide a variable effective pupil corresponding to the adjusted laser beam. The beam directing optics are further configured to direct the adjusted beam to one or more targets within a scan field. A lens, having a field of view encompassing at least the scan field, is configured to focus the directed laser beam onto the one or more targets within the scan field. A control processor is configured to receive input corresponding to a material processing parameter, and to issue at least one optimized control signal based on the at least one material processing parameter. The beam adjusting optics can be, for example, a zoom telescope. The beam directing optics can be, for example, one or more galvanometer mirror scanners. The system may further include a motion system that is configured to move a work piece containing at least one target relative to the scan field, and to position the at least one target within the scan field for processing (e.g., laser trimming of a circuit component or link blasting in a memory array).

In one such embodiment, the optimized control signal is an optimum effective pupil of the beam directing optics corresponding to a scan field dimension. In another such embodiment, the optimized control signal is an optimum scan field dimension corresponding to one of the effective pupil of the beam directing optics, a focused laser beam spot size, a positional accuracy, a scanning speed, a material handling step size of a motion system, and a telecentricity value. In another such embodiment, the optimized control signal is an optimum material handling step size corresponding to one of a scan field dimension, a step period of a motion system, a substrate dimension, and a dimension of a selected area of a substrate. Note that the beam adjusting optics can, for instance, be automatically or manually operated to adjust the beam expansion ratio according to an optimum beam expansion ratio value determined by the controller.

The material processing parameter can be, for example, any one of a spot size, a substrate dimension, a dimension of a selected area of a substrate, an orientation of a selected area of a substrate, a packing density, a step time of a motion system, a step size of a motion system, a number of steps of a motion system, a scan speed, a positional accuracy, a telecentricity value, and a desired spot quality. The controller can be configured to determine at least one optimized value of the beam expansion ratio, a scan field dimension, and a material handling step size of a motion system, based on the material processing parameter.

In one particular case, the beam expansion ratio is a first value, and the scan field is a first scan field. Here, the beam adjusting optics are further configured to again adjust the beam expansion ratio from the first value to a second value, and the beam directing optics are further configured to direct the again adjusted beam to a target within the second scan field. In one such embodiment, the first scan field has a first size and the second scan field has a second size. In another such embodiment, the first scan field has a first shape and the second scan field has a second shape. In another particular case, the field of view of the lens encompasses at least a first scan field and a second scan field, and is further configured to focus a first directed laser beam with a first effective pupil size onto one or more targets within the first scan field, and to focus a second directed laser beam with a second effective pupil size onto one or more targets within the second scan field, wherein at least one scan field size is limited by spot size degradation over the field of view.

The system may include a control processor that is configured to receive an input identifying the scan field, and to issue scan control signals based on the received input. Here, the beam directing optics are further configured to direct the adjusted beam in accordance with the issued scan control signals. The system may include a control processor that is configured to receive an input corresponding to a focused beam spot size, and to issue spot size control signals based on the received input. Here, the beam adjusting optics are further configured to adjust the beam expansion ratio in accordance with the issued spot size control signals. The system may include a control processor that is configured to receive an input corresponding to a beam spot size, and to issue spot size control signals based on the received input. Here, a display monitor can be configured to display parameters for manually operating the beam adjusting optics to adjust the beam expansion ratio in accordance with the issued spot size control signals. The system may include a control processor that is configured to receive an input identifying the scan field, and to issue motion control signals based on the received input. Here, a motion system is configured to move a work piece relative to the scan field in accordance with the issued motion control signals.

Another embodiment of the present invention provides a method of flexibly optimized material processing. The method includes receiving at least one material processing parameter relevant to impinging a work piece with a laser beam. The method continues with issuing at least one optimized control signal based on the at least one material processing parameter. The method further includes adjusting the laser beam to a first adjusted beam in accordance with the at least one optimized control signal, and directing the adjusted laser beam to one or more targets within a first scan field. The method proceeds with focusing the directed beam onto the one or more targets within the first scan field. Note that adjusting the laser beam to a first adjusted beam may include automatically or manually adjusting a beam expansion ratio to a first optimized value.

In one such embodiment, issuing at least one optimized control signal includes issuing an optimum effective pupil corresponding to a scan field dimension. In another such embodiment, issuing at least one optimized control signal includes issuing an optimum scan field dimension corresponding to one of an effective pupil, a process beam spot size, a positional accuracy, a scanning speed, a material handling step size, and a telecentricity value. In another such embodiment, issuing at least one optimized control signal includes issuing an optimum material handling step size corresponding to one of a scan field dimension, a step period of a motion system, a substrate dimension, and a dimension of a selected area of a substrate. In another such embodiment, issuing at least one optimized control signal includes issuing an optimum value of at least one of a beam expansion ratio, a scan field dimension, and a material handling step size based on the process parameter. The at least one material processing parameter received can be, for example, any one of a spot size, a substrate dimension, a dimension of a selected area of a substrate, orientation of a selected area of a substrate, packing density, a step time of a motion system, step size of a motion system, a number of steps of a motion system, a scan speed, a positional accuracy, a telecentricity, and a spot quality.

In one particular case, adjusting the laser beam to a first adjusted beam includes adjusting a beam expansion ratio to a first value. Here, the method includes further adjusting the beam expansion ratio to a second value, and directing the further adjusted beam to one or more targets within a second scan field. In one such case, the first scan field has a first size and the second scan field has a second size. In another such case, the first scan field has a first shape and the second scan field has a second shape. Adjusting the laser beam can be carried out, for example, using a zoom telescope. Directing the adjusted laser beam can be carried out, for example, using one or more galvanometer mirror scanners. In another particular case, adjusting the laser beam to a first adjusted beam includes adjusting a beam expansion ratio to a first value, where the method further includes adjusting the beam expansion ratio to a second value to provide a second adjusted beam, directing the second adjusted beam to one or more targets within a second scan field, and focusing the second adjusted beam onto one or more targets within the second scan field. Here, at least one scan field size is limited by spot size degradation over a field of view. In another particular case, the first scan field size is limited by spot size degradation at a first effective pupil size over the field of view, and the second scan field size is limited by spot size degradation at a second effective pupil size over the field of view.

The method may include receiving an input identifying a scan field dimension, issuing scan control signals based on the received input, and directing the adjusted beam in accordance with the issued scan control signals. The method may include receiving an input identifying a focused beam spot size, issuing spot size control signals based on the received input, and adjusting a beam expansion ratio in accordance with the issued spot size control signals. The method may include receiving an input identifying a focused beam spot size, issuing spot size control signals based on the received input, and displaying parameters for manually adjusting a beam expansion ratio in accordance with the issued spot size control signals. The method may include receiving an input identifying a scan field dimension, and issuing motion control signals based on the received input, to move the work piece relative to the scan field in accordance with the issued scan control signals.

Another embodiment of the present invention provides a material processing system. The system includes an emitter configured to emit a laser beam, a control processor configured to issue optimized control signals, and beam adjusting optics configured to adjust the emitted laser beam in accordance with at least one of the optimized control signals. A lens, having a field of view, is configured to focus the adjusted beam onto one or more targets within a scan field encompassed by the field of view. Beam directing optics are configured to direct the adjusted beam to at least one of the one or more targets within the scan field. In one such case, the scan field is a first scan field. Here, the beam adjusting optics are further configured to again adjust the emitted laser beam, and the lens is further configured to focus the again adjusted beam onto one or more targets within a second scan field encompassed by the field of view. In addition, the beam directing optics are further configured to direct the again adjusted beam within the second scan field. The beam directing optics can be further configured to direct the adjusted beam in accordance with at least one of the optimized control signals. The system may further include a motion system configured to move a work piece relative to the scan field in accordance with at least one of the control signals.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 6 depicts a look-up table usable to control the micro-machining system shown in FIG. 2, in accordance with one embodiment of the present invention.

DETAILED DESCRIPTION OF THE INVENTION

Embodiments of the present invention can be employed to machine features at various sizes and/or packing densities on work pieces having different sizes and/or shapes. This machining can be accomplished without using different systems and without manually installing and de-installing different focus lenses in the scan subassembly. Various material processing parameters including, for example, field size, accuracy, telecentricity, step size and/or spot size can be flexibly optimized for a particular application.

Overview

Figure 1:
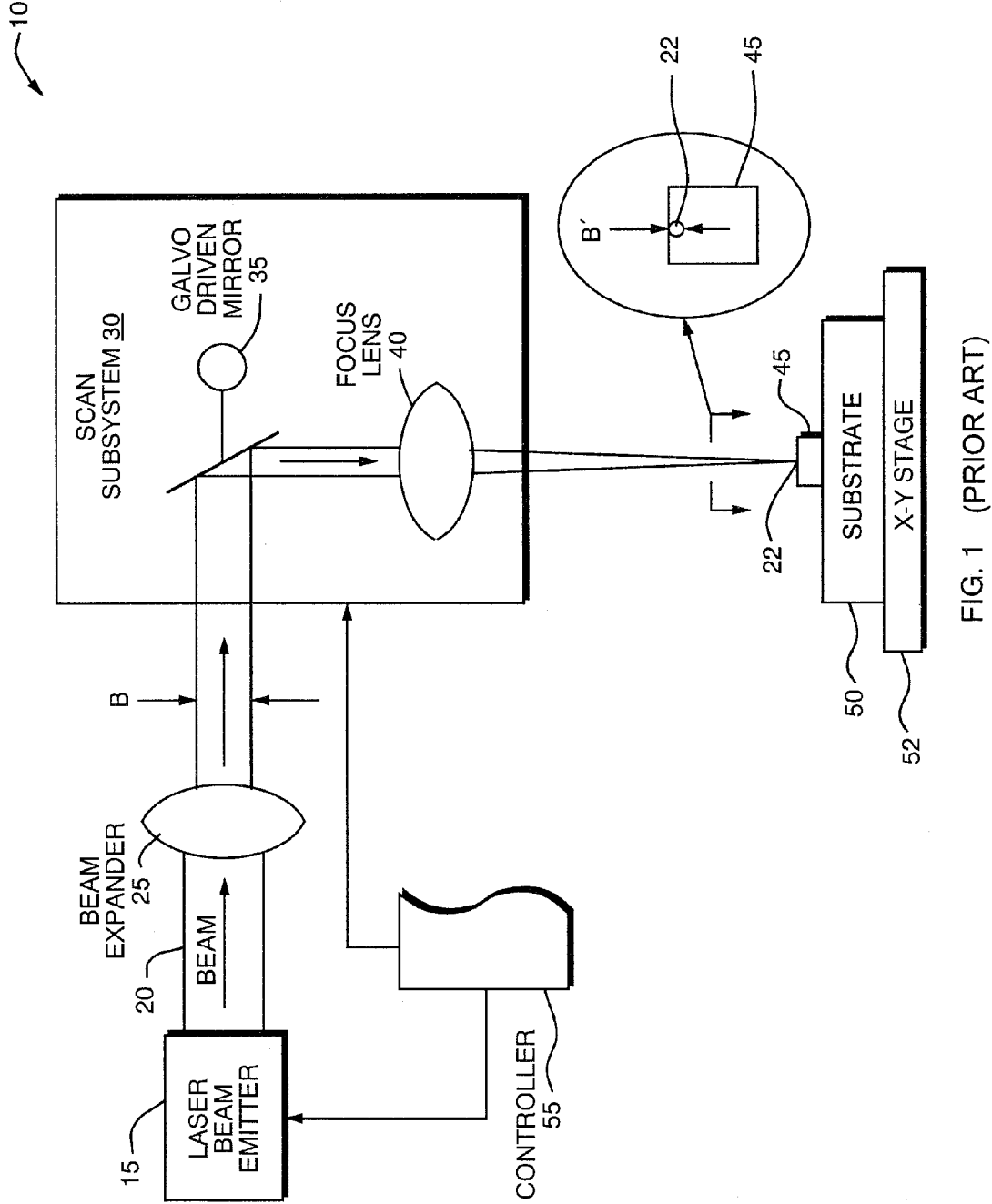
FIG. 1 depicts a conventional micro-machining system.
Figure 2:
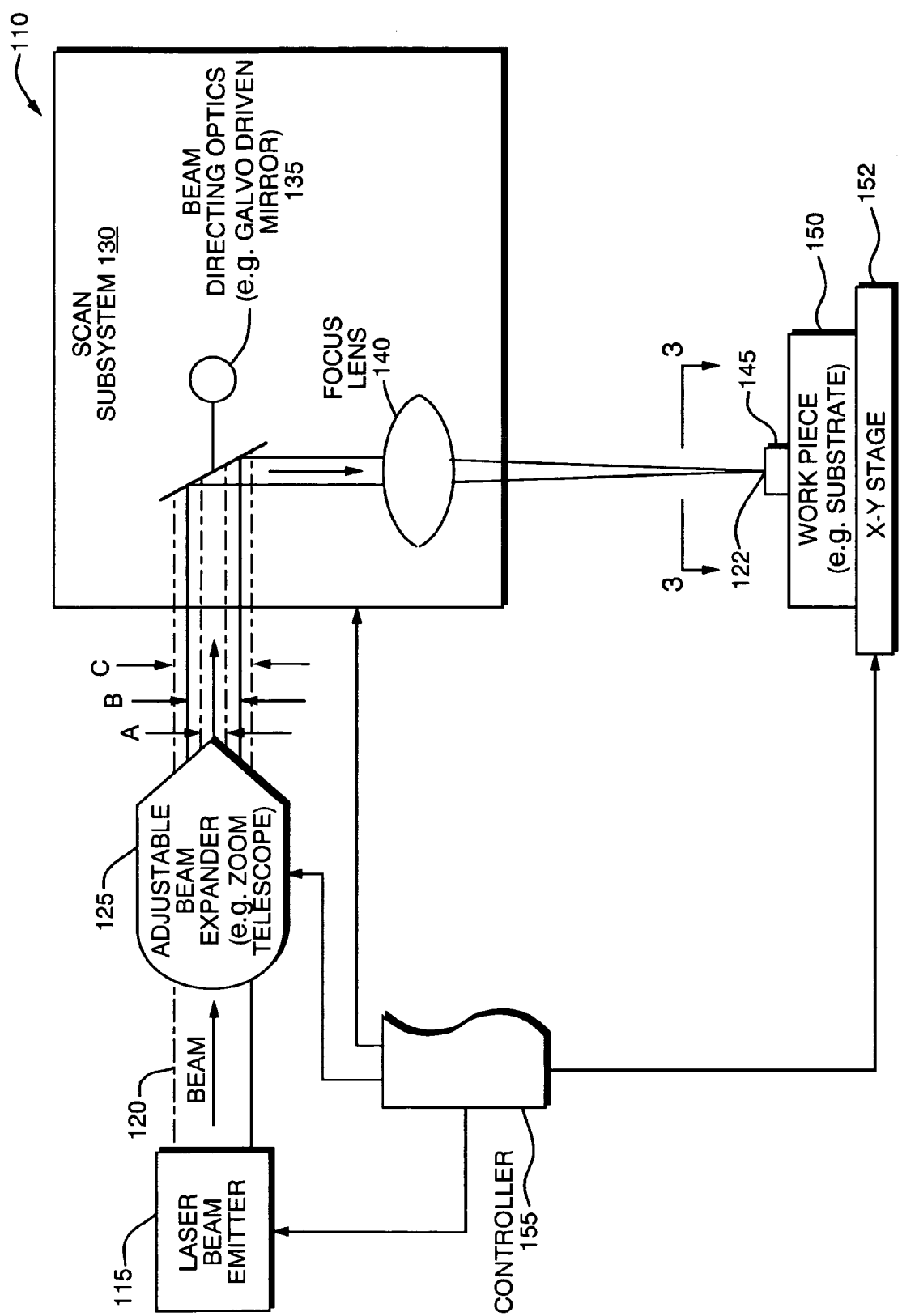
FIG. 2 depicts a micro-machining system configured in accordance with one embodiment of the present invention.

FIG. 2 depicts a micro-machining system 110 configured in accordance with one embodiment of the present invention. The system could be used for various types of machining operations, such as a trimming operation for untrimmed circuit elements (e.g., film resistors, capacitors, and inductors) formed on a PCB panel or on any panel or other type of substrate. Note that the system 110 can be employed for other applications (e.g., drilling, marking, micro-perforating), and may include various other elements and supporting functionality not shown in FIG. 2, as will be apparent in light of this disclosure.

For trimming operations, the substrate will typically include one or more untrimmed circuit elements, such as resistors, capacitors, and/or inductors formed contiguous with at least one of dielectric or conductive layers that make up the substrate. Note that an untrimmed element may also include a portion of the dielectric layer or a portion of the conductive layer, as is the case for an untrimmed embedded capacitor. The substrate may include other circuitry and interconnections (both printed and placed) as well.

For other operations, such as marking, drilling, and perforating, the substrate may include any componentry or features that relate to that particular substrate's function, whether it be electrical, mechanical, chemical, textural, or visual in nature. Regardless of the substrates topology and intended function, the principles of the present invention may be employed to selectively and accurately direct an energy beam to the substrate for whatever purpose.

The substrate may be used to form a plurality of substantially identical circuits, formed in a repeated pattern, or to form a single circuit (e.g., a computer mother board). On the other hand, the substrate may be used to form a plurality of different circuits formed in a pattern. The substrate may be the same size as the finished circuit board fabricated therefrom, or may be subsequently diced up to form a plurality of smaller sized finished circuit boards.

System Architecture

As shown in FIG. 2, the system 110 includes laser beam emitter 115 operating under the control of the system controller 155. System controller 155 may include one or more controllers (e.g., programmable microcontrollers configured with one or more processors, I/O capability such as a controller interface having a keyboard and display, memory, and a number of coded processes to carry out desired functionality) for controlling the position, velocity and power output of the focused laser beam and movement of the substrate during machining, as well as during periods when the system is not performing machining operations. The beam emitter 115 may include, for example, a laser beam generator such as a solid state or gas laser, but could alternatively be a simple emitting device, such as an optic fiber that emits a laser beam generated outside the system.

Although the laser beam emitter 115 may be of any type, the laser beam emitter 115 will emit an energy beam at a wavelength that is compatible with the type of machining being performed. For example, if a dielectric material is primarily being processed, a $CO_2$ laser emitting at a wavelength of approximately 10 um may be used. If a conductive layer is being trimmed, then a solid state laser (e.g., laser diode) emitting at a wavelength of approximately 1.06 um may be used. If the trimming is a photochemical process, the laser wavelength may be visible or ultraviolet light, such a light of approximately 533 nm and shorter.

The emitted laser beam 120 passes through an adjustable beam expander 125 (e.g., zoom telescope) to the scan subsystem 130. Adjustment of the beam expander 125 can be controlled either manually or by the system controller 155 as shown in FIG. 2, as will be discussed herein. The scan subsystem 130 also operates under the control of the system controller 155.

The scan subsystem 130 includes beam directing optics 135 and focus lens 140. The beam directing optics 135 is provided between the beam expander 125 and the focus lens 140, and is capable of directing the laser beam over a selected region of the substrate 150 (or other work piece). This selected region is also referred to the selected scan field herein. The focus lens 140 is for focusing the directed laser beam to a desired size and energy density at the focal point 122. and The beam directing optics 135 may be implemented with conventional technology, and is capable of scanning a laser beam in one or more directions. In the FIG. 2 embodiment, a pair of orthogonally mounted galvanometer mirror scanners (only one shown) serve as the beam directing optics 135. Each galvanometer mirror scanner (sometimes referred to herein as a galvo driven mirror or galvo mirror) includes an angular position transducer for tracking the angular position of the mirrors, and a servo driver for controlling the angular rotation of each deflecting mirror to direct the laser beam along a path to a desired position.

In the FIG. 2 embodiment, the system controller 155 includes all driving controls for the laser beam emitter 115 and the beam directing optics 135. However, these controls could be incorporated into one or more subsystem controllers, separate from the system controller 155, if so desired.

For resistor trimming operations, the lens 140 may, for example, range from about 1.0 inch in diameter up to about 8 inches in diameter, and have a field of view that allows the laser beam to be directed over about a 2 to 4 inch square region or scan field. In one particular embodiment, the focus lens 140 facilitates up to a 3.5 inch square scan field on the work piece 150. Note, however, that the lens diameter and field of view can vary from one embodiment to the next, and the present invention is not intended to be limited to any one such embodiment.

In any case, the maximum scan field of the scan subsystem 130 is limited by the field of view of the focus lens 140, and allows a focused beam to address selected positions within the field of view. When the scan subsystem 130 is a galvo-based scan subsystem with two mirrors, over an intermediate scan field, the effective pupil of the mirrors may be increased without increasing the mirror size as would be required for maintaining a large pupil over the largest scan field.

In general, the field of view of lens 140 is usually smaller than the size of the work piece 150. Typically, all of the machining within a scan field encompassed in the lens 140 field of view is performed without moving the work piece 150. The work piece 150 is then moved to position the next target portion of the work piece 150 in the field of view of lens 140 for processing. The X-Y stage 152 is adapted to move or step the work piece 150 so as to position the next target portion of the work piece 150 into the field of view of lens 140.

The X-Y stage 152 can operate, for example, under the control of the system controller 155. Alternatively, the X-Y stage 152 operates under manual control (e.g., hand operated X-Y micrometers), or the under the control of a dedicated controller module that is distinct from the system controller 155. In one embodiment, the lens 140 is a telecentric lens and the beam directing optics 135 are positioned substantially at a focal surface of the lens 140 so that the laser beam impinges substantially normal or perpendicular to the target surface.

The scan subsystem 130 emits a beam that is focused substantially on a feature 145 of the work piece 150, such as a resistor or simply the surface work piece 150 itself, and has sufficient power to precisely remove or otherwise machine or process the feature or work piece material in a controlled manner. The position of the laser beam 120 emitted by the laser beam emitter 115 can be directed by the beam directing optics 135 of the scan subsystem 130 to impinge on the focal surface within the field of view of the lens 140.

The power and modulation of the laser beam can be controlled, for example, by laser control signals issued by the controller 155 to the emitter 115. Likewise, the desired positioning and motion characteristics of the laser beam 120 can be controlled by scan control signals issue by the system controller 155 to the scan subsystem 130. The system controller 155 of the embodiment shown in FIG. 2 is generally programmed or otherwise configured to control the operation of the entire machining system. However, numerous control schemes will be apparent in light of this disclosure.

The focus lens 140 focuses the beam so that the beam impinges focal point 122 on the feature 145 of work piece 150 (or on the work piece itself) to perform the desired machining. In one particular implementation, the feature 145 is a film resistor and work piece 150 is a substrate on which the film resistor is formed. The directed beam impinges on a resistor to perform a laser trimming operation, which generally increases the resistance of the resistor to some target value. However if, for example, the applicable operation required drilling an aperture or perforation in the work piece 150, then the feature 145 could be a target spot on the surface of the work piece 150, where the laser beam would be focused to impinge on that target spot.

Figure 3A:
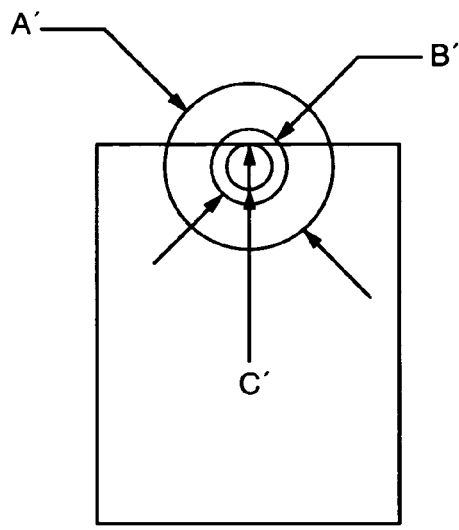
FIG. 3A depicts exemplary laser beam spots at the focal point achievable using the micro-machining system of FIG. 2.

As previously stated, the adjustable beam expander 125 can be a zoom telescope. In such an embodiment, the zoom telescope varies the pupil size of the beam entering the scan subsystem 130. Thus, by controlling operation of the zoom telescope, the effective entrance pupil of the beam entering the scan subsystem 130 can be adjusted as desired. For example, using the zoom telescope as depicted in FIG. 2, the beam entering the scan subsystem 130 may have a pupil size which ranges from size A to size C, and the focused beam may have corresponding spot sizes ranging from A' to C' at the point 122, as shown in FIG. 3A. Hence, by controlling the operation of the zoom telescope, the spot size can be modified to better correspond to the desired processing.

The beam expander 125 can be controlled either manually by an operator or automatically by the system controller 155 (or other such controlling environment) to adjust the pupil size of the beam entering the scan subsystem 130, based on the desired spot size. A combination manual and automatic mode (i.e., semi-automatic) can also be configured, where a lower degree of operator involvement is required. Note that the system can be configured so that the operator can be relatively non-skilled, in that express instructions can be presented to the operator (e.g., via a monitor or pre-programmed audio instructions) indicating how to adjust, control, or otherwise manipulate the beam expander 125 to provide a desired pupil size.

Adjustable Pupil Size

Figure 3B:
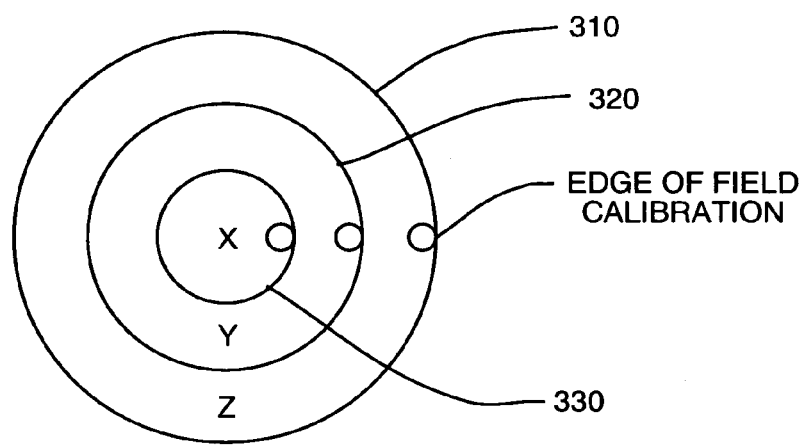
FIG. 3B depicts the exemplary laser beam spots of FIG. 3A in relation to the scan field.

Thus, the beam expander 125 can be operated to vary the pupil size of the beam entering the scan subassembly 130 from pupil size A, to pupil size B, to pupil size C, which in turn results in the spot size at the point 122 varying from spot size A', to spot size B', to spot size C', respectively. As shown in FIG. 3B, pupil size A, which is the smallest, results in focus spot size A', which is optimized to be the largest without substantial degradation over the largest scan field 310 of the focus lens 140. Pupil size B results in an optimized intermediate spot size B' without substantial degradation over an intermediate scan field 320. Pupil size C, is the largest pupil size, and results in the smallest spot size C' without substantial degradation over the smallest optimized scan field 330. Within any scan field, the spot size may be increased by decreasing the beam expansion ratio of the laser beam. Note that when the scan field is limited by degradation, the beam cannot be expanded unless the scan field is reduced.

Adjustable Scan Field

Figure 4:
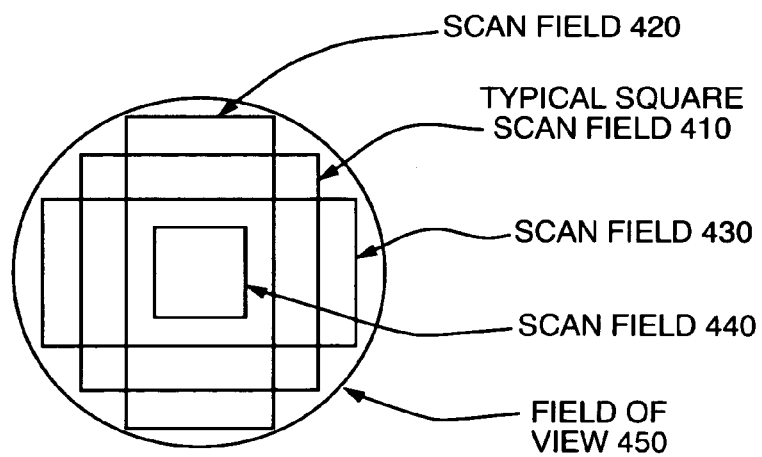
FIG. 4 depicts example variations in the scan field that can be accommodated by the micro-machining system of FIG. 2.

FIG. 4 depicts various shaped scan fields 410, 420, 430 and 440 within the lens field of view 450, which are achieved by controlling the beam directing optics 135 to correspond to the optimized scan field (e.g., via signals from the system controller 155). By controlling the adjustable beam expander 125 or otherwise modifying the beam pupil, the optimized combinations of spot sizes A', B' and C' and scan field sizes 410, 420, 430 and 440 can be accommodated as shown in FIG. 4.

The optimized spot sizes and scan field sizes are achieved by controlling the entrance pupil to change the spot size, and by controlling the scan subsystem 130, and more particularly the beam directing optics 135, to change the scan field size. The control can be automatic (e.g., carried out by controller 155) or semi-automatic (e.g., carried out by controller 155 in part and by an operator in part) or manually (e.g., carried out by an operator).

An optimized scan field may be determined within a field of view in conjunction with motion of the X-Y stage 152. A different area of the work piece 150 can be stepped to using the stage 152, to process further elements within the scan field. If the work piece 150 has a tiled processing surface with contiguous segments, the motion of the X-Y stage 152 may be determined based on the properties of the scan field shape. For example, controller 155 may control stage 152 to in increments proportional to the X-Y dimensions of scan field 430. The scan field may, in turn, have proportions determined to optimize the scanning speed of the X-Y stage 152.

Referring to FIG. 3B, scan field 310 may contain an accuracy requirement. Scan field 320, which is smaller than 310, may have an increased accuracy due to the decreased scan field size. Scan field 330, which is the smallest scan field, may have the highest level of accuracy due to the smallest field size. As the scan fields are reduced from 310 to 320 to 330, the non-telecentric error of a non-telecentric imaging system will be reduced in sequence from the largest scan field 310 through 320 to the smallest scan field 330.

System Control

Figure 5:
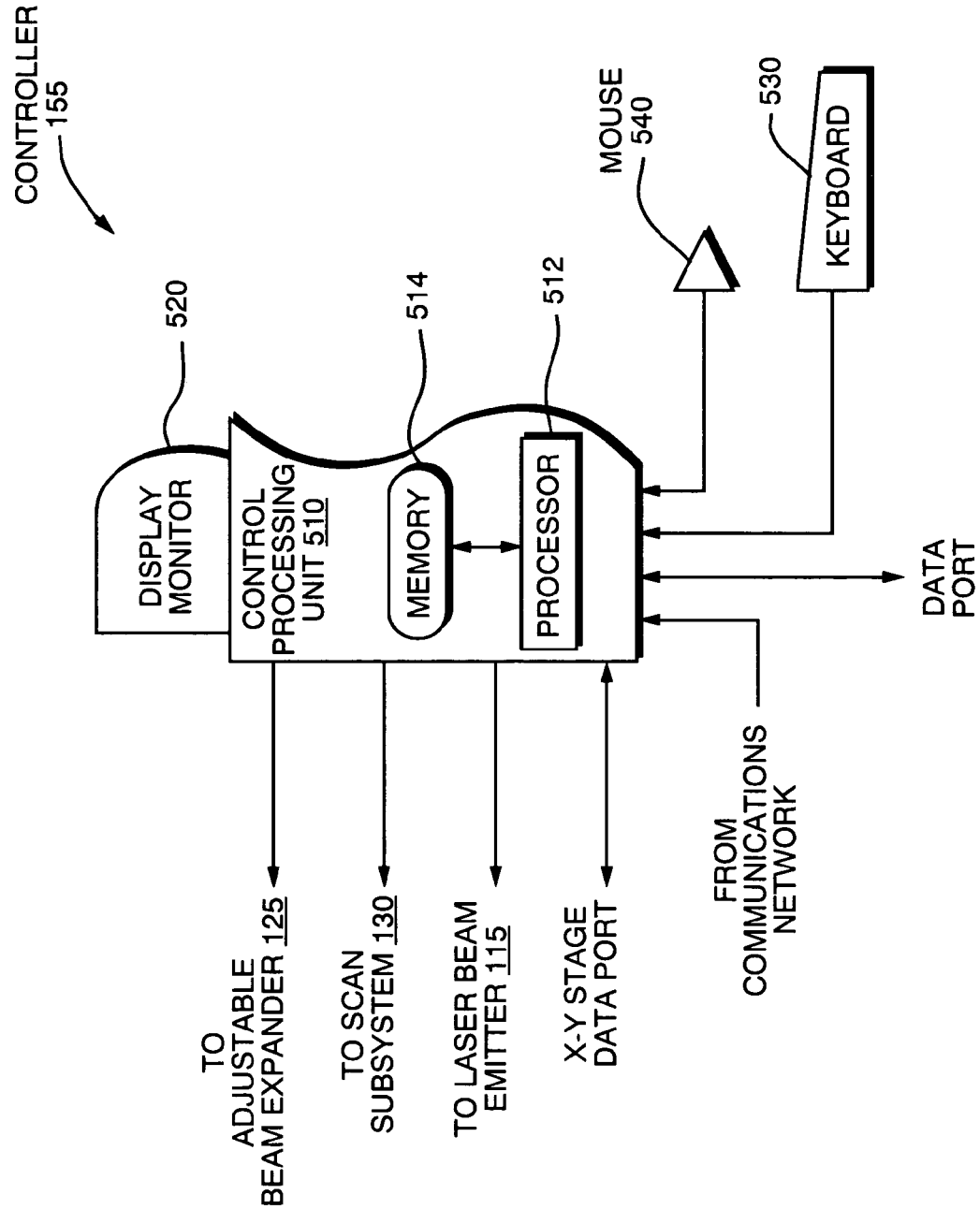
FIG. 5 is a detailed depiction of a micro-machining system controller configured in accordance with one embodiment of the present invention.

FIG. 5 illustrates a block diagram of the controller 155 configured in accordance with an embodiment of the present invention. As shown, the controller 155 includes a control processor 510 having an interconnected processor 512 and memory 514. Note that memory 514 could be multiple memory devices including, for example, random access memory, read only memory, floppy disk memory, hard disk memory, and/or other types of memory. The processor 512 interacts with the memory 514 to function in accordance with programmed instructions stored on the memory 514 and to store or access data in the memory 514.

The control processor 510 is interconnected to a display monitor 520 and controls the display of relevant information to the system operator. Input devices including a keyboard 530 and mouse 540 are also provided. These devices can be utilized by the operator to input data to the control processor 510. A connection to a communications network is also provided to allow inputs and system programming from a remote location. The control processor 510 is also interconnected to the laser beam emitter 115 and scan subsystem 130. The control processor 510 may be optionally connected to the adjustable beam expander 125.

In operation, the control processor unit 510 receives operator inputs via the keyboard 530, mouse 540, data ports (e.g., X-Y stage data ports and RS232 data port), or communications network. The control processor 510 processes these inputs in the processor 512, in accordance with the programmed instruction stored in the memory 514, to generate control signals to the laser emitter 115, to the scan subsystem 130, and optionally to the beam expander 125.

FIG. 6 depicts a lookup table that can be stored in the memory 514 of the control processor 510 and used by the processor 512 to generate control signals to the laser emitter 115, the scan subsystem 130, the beam expander 125 and/or the display monitor 520.

As shown in FIG. 6, a portion of the lookup table includes a column having each of various scan field sizes. A row associated with each of the scan field sizes has a set of parameters for scanning the galvo mirror(s) over the selected field size/shape. Accordingly, an operator can input a scan field size, such as scan field size 610 corresponding to the typical square scan field 410 shown in FIG. 4, and the processor 512 will process the input scan field size 610 by accessing the lookup table of FIG. 6 in the memory 514 to determine that the galvo mirror must be rotated to correspond to 610'. The processor 512 then generates a scan control signal that is transmitted to the scan subsystem 130. In accordance with the received scan control signal, the galvo driven mirror (beam directing optics 135) is operated to correspond to 610' thereby establishing the desired scan field.

The operator may also input a feature size, a feature density, or alternatively a spot size, which can be processed by the processor 512 by accessing the lookup table shown in FIG. 6 in the memory 514 to determine the appropriate zoom telescope (beam expander 125) operation for the applicable field size. For example, if the desired spot size is a medium spot size (e.g., 35 microns), the processor 512 can determine that the zoom telescope must be operated to correspond to b' as indicated in the fourth column of the lookup table shown in FIG. 6.

Accordingly, the processor 512 will generate control signals corresponding to the determined zoom telescope adjustment and either transmit the control signals to the zoom telescope so that the adjustment is made automatically or to the display monitor 520. If the control signal is transmitted to the display monitor 520, the display monitor will present to the system operator with appropriate instructions for manually adjusting the zoom telescope to correspond with b'. The adjustment of the zoom telescope will result in a pupil size B of the beam entering the scan system 130 and a corresponding spot size B' of the beam at the focal point 122.

Although only a single listing of each of the scan field sizes for the scan fields depicted in FIG. 4 are shown in FIG. 6, it will be recognized in light of this disclosure that the scan field size column may include multiple entries for the same size and shape scan field so that other possible combinations of scan field size and shape and spot size are included within the lookup table. It will further be recognized that in lieu of a lookup table, the programmed instructions stored at the memory 514 could include corresponding algorithms that would be executed by the processor 512 to generate the desired control signals. Also, memory structures other than lookup tables, such as linked lists and simple indexed data files, can be used to store pertinent control information.

FIG. 6 shows in the column labeled X-Y step size that for different field size and shape, the X-Y step parameters (e.g., step time, step size, number of steps) can change, for instance, from b" to a". Note that step size can be adjusted for either the X or Y direction, or both. Also, the column labeled calibration shows that the field calibration may change with field size and shape, for instance, b'" and a'".

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A flexibly optimized material processing system comprising:
    a laser emitter configured to emit a laser beam;
    beam adjusting optics having an adjustable beam expansion ratio, and configured to adjust the emitted laser beam by adjusting the beam expansion ratio;
    beam directing optics configured to provide a variable effective pupil corresponding to the adjusted laser beam, the beam directing optics further configured to direct the adjusted beam to one or more targets within a scan field corresponding to at least one selected area of a substrate;
    a lens, having a field of view encompassing at least the scan field, configured to focus the directed laser beam onto the one or more targets within the scan field; and
    a control processor configured to receive input corresponding to a material processing parameter and to issue at least one optimized control signal corresponding to the input to reduce degradation over the field of view based on the at least one material processing parameter wherein one said optimized control signal is an optimum scan field value corresponding to one of the group of values consisting of the effective pupil size of the beam directing optics, a focused laser beam spot size, a positional accuracy, a scanning speed, a material handling step size of a motion system, and a telecentricity value.

2. The system of claim 1 wherein the at least one optimized control signal is an optimum material handling step size corresponding to one of the group of values consisting of a scan field dimension, a step period of a motion system, a substrate dimension, and a dimension of a selected area of a substrate.

3. The system of claim 1 wherein the material processing parameter is one of the group of parameters consisting of a spot size, a substrate dimension, a dimension of a selected area of a substrate, an orientation of a selected area of a substrate, a packing density, a step time of a motion system, a step size of a motion system, a number of steps of a motion system, a scan speed, a positional accuracy, a telecentricity value, and a desired spot quality.

4. The system of claim 1 wherein the controller is configured to determine at least one of the group of values consisting of an optimized value of the beam expansion ratio, a scan field dimension, and a material handling step size of a motion system based on the material processing parameter.

5. The system of claim 1 wherein:
    the beam expansion ratio is a first value, and the scan field is a first scan field;
    the beam adjusting optics are further configured to again adjust the beam expansion ratio from the first value to a second value; and
    the beam directing optics are further configured to direct the again adjusted beam to a target within the second scan field.

6. The system of claim 5 wherein the first scan field has a first size and the second scan field has a second size.

7. The system of claim 5 wherein the first scan field has a first shape and the second scan field has a second shape.

8. The system of claim 1 wherein the beam adjusting optics are manually operated to adjust the beam expansion ratio according to an optimum beam expansion ratio value determined by the controller.

9. The system of claim 1 further comprising:
    a control processor configured to receive an input identifying the scan field and to issue scan control signals based on the received input, wherein the beam directing optics are further configured to direct the adjusted beam in accordance with the issued scan control signals.

10. The system of claim 1 further comprising:
    a control processor configured to receive an input corresponding to a focused beam spot size and to issue spot size control signals based on the received input, wherein the beam adjusting optics are further configured to adjust the beam expansion ratio in accordance with the issued spot size control signals.

11. The system of claim 1 further comprising:
    a control processor configured to receive an input corresponding to a beam spot size and to issue spot size control signals based on the received input; and
    a display monitor configured to display parameters for manually operating the beam adjusting optics to adjust the beam expansion ratio in accordance with the issued spot size control signals.

12. The system of claim 1 wherein:
    the beam adjusting optics comprise a zoom telescope; and the beam directing optics comprise one or more galvanometer mirror scanners.

13. The system of claim 1 further comprising:
a control processor configured to receive an input identifying the scan field and to issue motion control signals based on the received input; and
a motion system configured to move a work piece relative to the scan field in accordance with the issued motion control signals.

14. The system of claim 1 wherein the field of view of the lens encompasses at least a first scan field and a second scan field, and is further configured to focus a first directed laser beam with a first effective pupil size onto one or more targets within the first scan field, and to focus a second directed laser beam with a second effective pupil size onto one or more targets within the second scan field, wherein at least one scan field size is limited by spot size degradation over the field of view.

15. The system of claim 1 further comprising:
a motion system configured to move a work piece containing at least one target relative to the scan field, and to position the at least one target within the scan field for processing.

16. The flexibly optimized material processing system of claim 1 further comprising a controller interface.

17. A material processing system comprising:
an emitter configured to emit a laser beam;
a control processor configured to receive input and issue optimized control signals corresponding to the input;
beam expansion ratio adjusting optics configured to adjust the emitted laser beam in accordance with at least one of the optimized control signals;
a lens, having a field of view, configured to focus the adjusted beam onto one or more targets within a scan field that is a selected area of a substrate and is encompassed by the field of view; and
beam directing optics configured to direct the adjusted beam to at least one of the one or more targets within the scan field wherein at least one optimized control signal is optimized to reduce degradation over the field of view and wherein one said optimized control signal is an optimum scan field value corresponding to one of the group of values consisting of the effective pupil of the beam directing optics, a focused laser beam spot size, a positional accuracy, a scanning speed, a material handling step size of a motion system, and a telecentricity value.

18. The system of claim 17 wherein:
the scan field is a first scan field;
the beam expansion ratio adjusting optics are further configured to again adjust the emitted laser beam;
the lens is further configured to focus the again adjusted beam onto one or more targets within a second scan field encompassed by the field of view; and
the beam directing optics are further configured to direct the again adjusted beam within the second scan field.

19. The system of claim 17 wherein the beam directing optics are further configured to direct the adjusted beam in accordance with at least one of the optimized control signals.

20. The system of claim 17 further comprising:
a motion system configured to move a work piece relative to the scan field in accordance with at least one of the control signals.

21. The material processing system of claim 17 wherein the control processor comprises a controller interface.

22. The material processing system of claim 17, said control processor comprising a connection to a communications network for allowing inputs from a remote location.

23. A flexibly optimized material processing system comprising:
a laser emitter configured to emit a laser beam;
beam adjusting optics having an adjustable beam expansion ratio, and configured to adjust the emitted laser beam by adjusting the beam expansion ratio;
beam directing optics configured to provide a variable effective pupil corresponding to the adjusted laser beam, the beam directing optics further configured to direct the adjusted beam to one or more targets within a scan field corresponding to at least one selected area of a substrate;
a lens, having a field of view encompassing at least the scan field, configured to focus the directed laser beam onto the one or more targets within the scan field; and
a control processor configured to receive input corresponding to a material processing parameter and to issue at least one optimized control signal corresponding to the input to reduce degradation over the field of view based on the at least one material processing parameter wherein one said optimized control signal is an optimum effective pupil size of the beam directing optics corresponding to a scan field dimension.

24. The system of claim 23 wherein the beam adjusting optics are manually operated to adjust the beam expansion ratio according to an optimum beam expansion ratio value determined by the controller.

25. The system of claim 23 further comprising:
a control processor configured to receive an input identifying the scan field and to issue scan control signals based on the received input, wherein the beam directing optics are further configured to direct the adjusted beam in accordance with the issued scan control signals.

26. The system of claim 23 wherein:
the beam adjusting optics comprise a zoom telescope; and
the beam directing optics comprise one or more galvanometer mirror scanners.

27. The system of claim 23 further comprising:
a control processor configured to receive an input identifying the scan field and to issue motion control signals based on the received input; and
a motion system configured to move a work piece relative to the scan field in accordance with the issued motion control signals.

28. The system of claim 23 wherein the field of view of the lens encompasses at least a first scan field and a second scan field, and is further configured to focus a first directed laser beam with a first effective pupil size onto one or more targets within the first scan field, and to focus a second directed laser beam with a second effective pupil size onto one or more targets within the second scan field, wherein at least one scan field size is limited by spot size degradation over the field of view.

29. The system of claim 23 further comprising:
a motion system configured to move a work piece containing at least one target relative to the scan field, and to position the at least one target within the scan field for processing.

* * * * *